United States Patent [19]
Allread et al.

[11] Patent Number: 5,271,646
[45] Date of Patent: Dec. 21, 1993

[54] COUPLING ASSEMBLY

[75] Inventors: Alan R. Allread; Alan K. Clark, both of Jackson; Edward Foster, Michigan Center, all of Mich.

[73] Assignee: Aeroquip Corporation, Maumee, Ohio

[21] Appl. No.: 877,750

[22] Filed: May 4, 1992

[51] Int. Cl.⁵ .................... F16L 39/04; F16L 37/56
[52] U.S. Cl. .................... 285/137.1; 285/276; 285/305
[58] Field of Search .................... 285/276, 137.1, 305, 285/26, 29

[56] References Cited

U.S. PATENT DOCUMENTS

| | | | |
|---|---|---|---|
| 1,354,710 | 10/1920 | Wise | 285/276 X |
| 2,746,773 | 5/1956 | Bily | 285/276 X |
| 3,314,696 | 4/1967 | Ferguson et al. | 285/276 X |
| 3,317,220 | 5/1967 | Bruning | 285/276 X |
| 3,795,924 | 3/1974 | Kempler | 285/276 X |
| 3,869,153 | 3/1975 | De Vincent et al. | 285/137.1 |
| 3,900,221 | 9/1975 | Fouts | 285/276 |
| 3,924,882 | 12/1975 | Ellis | 285/276 X |
| 3,929,356 | 12/1975 | De Vincent et al. | 285/137.1 X |
| 4,163,573 | 8/1979 | Yano | 285/276 X |
| 4,193,948 | 3/1980 | Charmley et al. | 285/305 X |
| 4,260,184 | 4/1981 | Greenawalt et al. | 285/305 |
| 4,811,975 | 3/1989 | Paul, Jr. et al. | 285/305 |
| 4,884,829 | 12/1989 | Funk et al. | 285/305 X |
| 4,894,156 | 1/1990 | Murken | 285/305 X |
| 5,135,264 | 8/1992 | Elliot-Moore | 285/305 X |
| 5,169,178 | 12/1992 | Hunzinger | 285/137.1 X |
| 5,219,185 | 6/1993 | Oddenino | 285/137.1 X |

FOREIGN PATENT DOCUMENTS

| | | | |
|---|---|---|---|
| 1425470 | 11/1968 | Fed. Rep. of Germany | 285/305 |
| 0974024 | 11/1982 | U.S.S.R. | 285/305 |
| 0745526 | 2/1956 | United Kingdom | 285/276 |
| 0768974 | 2/1957 | United Kingdom | 285/276 |

Primary Examiner—Randolph A. Reese
Assistant Examiner—Heather Chun
Attorney, Agent, or Firm—Emch, Schaffer, Schaub & Porcello Co.

[57] ABSTRACT

A coupling assembly having a flange, at least one tube and a tube connection. The flange has an outer surface and at least one inner surface. The inner surface defines at least one tube receiving opening. The inner surface also defines a flange groove. A tube connection hole extends through the flange from the outer surface to the inner surface. The hole is in communication with the flange groove. The tube has an exterior surface. A groove is defined by the exterior surface. The tube is inserted in the tube receiving opening of the flange. The tube groove is aligned with the flange groove. A tube connection means, such as wire, is inserted in the tube connection hole. The tube connection means mates the flange groove and the tube groove. This engagement retains the tube in the flange and also allows it to move within the flange.

8 Claims, 5 Drawing Sheets

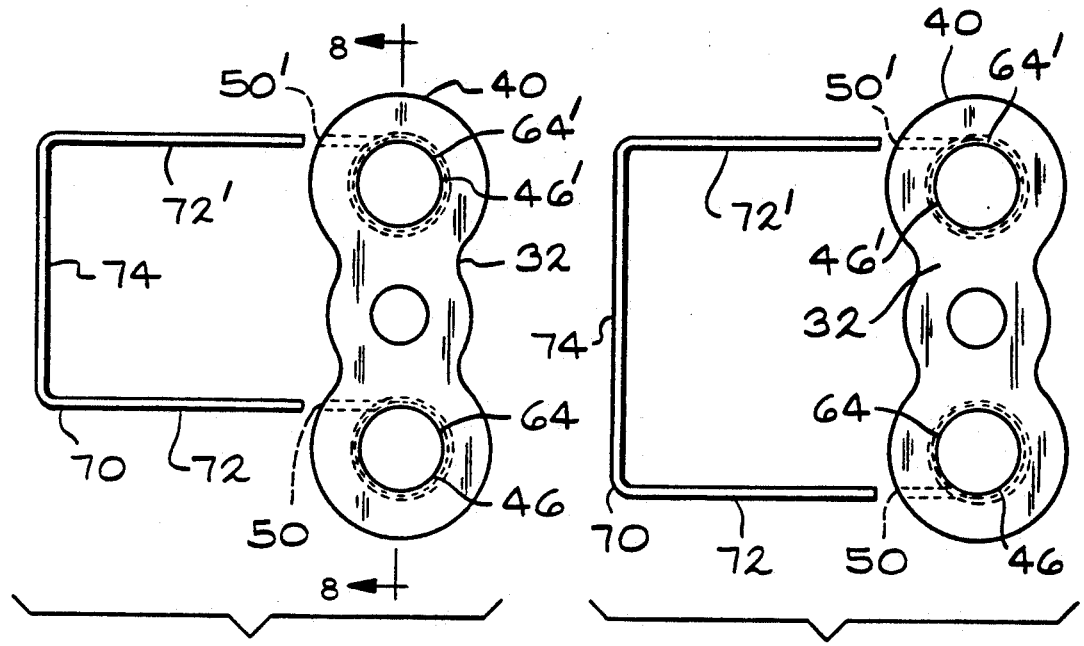
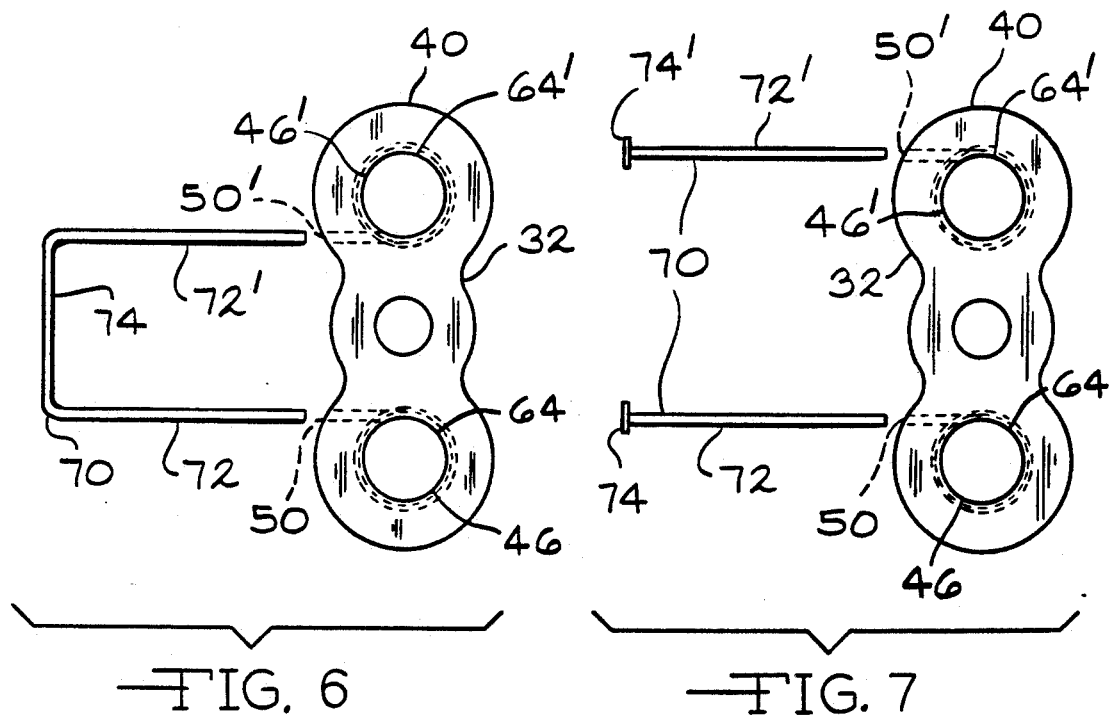

COUPLING ASSEMBLY

FIELD OF THE INVENTION

The present invention is directed generally to a coupling assembly. More specifically, the invention is directed to a coupling assembly having a flange and tubes in which the tubes have the ability to rotate within the flange.

BACKGROUND OF THE INVENTION

Coupling assemblies are known in the art. These prior art assemblies usually have tubes that are welded or brazed to a flange. This causes the tubes to be immovable once they are attached to the flange. This has resulted in many problems when the prior art coupling assemblies are used in conjunction with, for example, an automotive air conditioning compressor. Some of these problems include complex assembly, expensive and cumbersome packaging and difficulties in adjusting the compressor in an automobile because the tubes are fixed in place. The present invention solves the above problems by providing a simple and adjustable coupling assembly.

SUMMARY OF THE INVENTION

The present invention includes a flange, at least one tube and a tube connection means. The flange has an outer surface and at least one inner surface. The inner surface defines at least one tube receiving opening. The inner surface also defines a flange groove. A tube connection means hole extends through the flange from the outer surface to the inner surface. The hole is in communication with the flange groove. The tube has an exterior surface. A groove is defined by the exterior surface. The tube is inserted in the tube receiving opening of the flange. The tube groove is aligned with the flange groove. A tube connection means, such as wire, is inserted in the tube connection means hole. The tube connection means mates the flange groove and the tube groove. This engagement retains the tube in the flange and also allows it to move within the flange.

The primary object of the present invention is to provide a coupling assembly having tubes that can move with respect to a flange.

An important object of the present invention is to provide a coupling assembly that is simple to manufacture and easy to package.

Other objects and advantages of the present invention will become apparent as the invention is described hereinafter in detail with reference being made to the accompanying drawings.

DESCRIPTION OF THE DRAWINGS

FIG. 4 is a side view of a first embodiment of the present invention showing the insertion of a U-shaped tube connection means in the tube connection means holes to engage the tubes;

FIG. 5 is a side view of a second embodiment of the present invention showing the insertion of a U-shaped tube connection means in the tube connection means holes to engage the tubes;

FIG. 6 is a side view of a third embodiment of the present invention showing the insertion of a U-shaped tube connection means in the tube connection means holes to engage the tubes;

FIG. 7 is a side view of a fourth embodiment of the present invention showing the insertion of pin tube connection means in the tube connection means holes to engage the tubes;

DETAILED DESCRIPTION OF THE PREFERRED EMBODIMENTS

Figure 1:
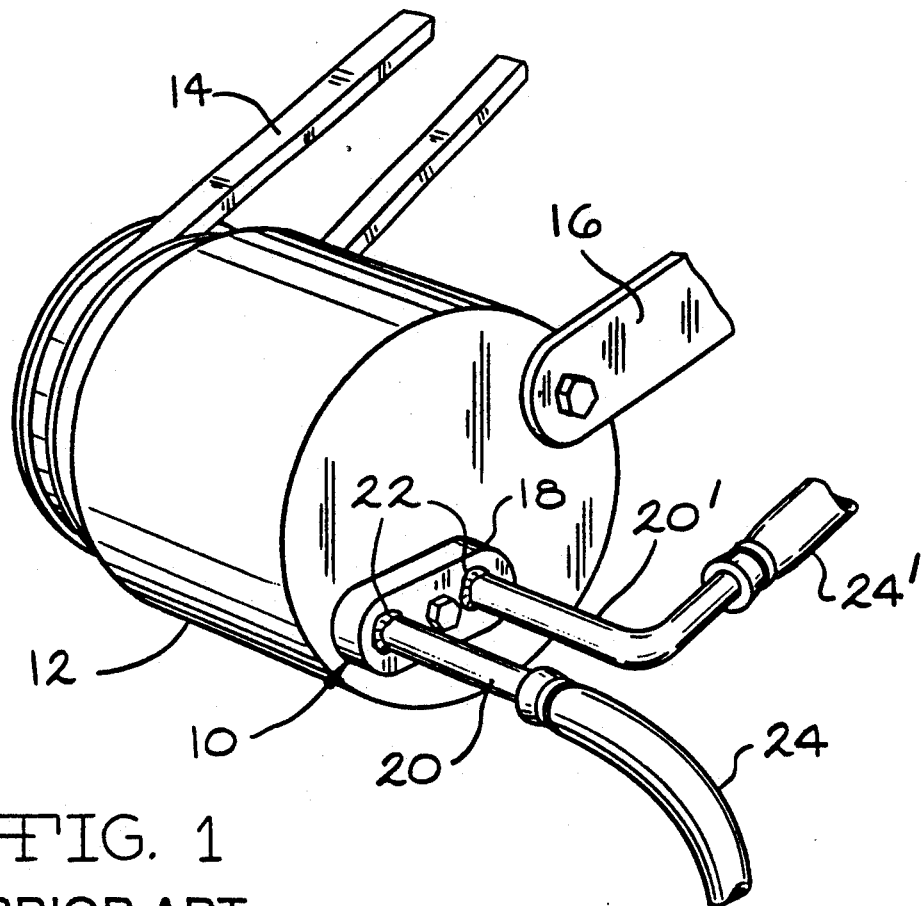
FIG. 1 is a perspective view of an automotive air conditioning compressor with a prior art coupling assembly attached thereto.

Referring now to the drawings, the preferred embodiments of the present invention are shown. Referring to FIG. 1, a prior art coupling assembly 10 is shown. The coupling 10 is connected to an automotive air conditioning compressor 12. The compressor 12 is attached to a drive belt 14. The compressor 12 is held in place on an automobile (not shown) by a bracket 16. The compressor is used to move refrigerant and change the pressure of the refrigerant in an automotive air conditioning system.

The prior art coupling assembly 10 includes a flange 18 and tubes or conduits 20 and 20'. The tubes 20 and 20' transport the refrigerant to the air conditioning system. The tubes 20 and 20' are permanently and fixedly connected to the flange 18 by welds or brazes 22. This prior art connection does not allow the tubes 20 and 20' to move with respect to the flange 18. This creates a problem when the belt 14 has to be adjusted or changed. In order to overcome this problem, flexible hoses 24 and 24' are attached to the prior art tubes 20 and 20', respectively, to allow the compressor 12 to be moved to adjust or change the belt 14. It has been found, however, that the use of flexible hoses is disadvantageous because of the inability to maintain a good seal between the tubes 20 and 20' and the flexible hoses 24 and 24', respectively. It has also been found that the flexible hoses can deteriorate over time.

The prior art coupling assembly shown in FIG. 1 has also been found to be difficult to assemble. Further, this type of coupling assembly when attached to, for example, a compressor is expensive and cumbersome to package because the package must be enlarged to contain the immovable tubes.

Figure 2:
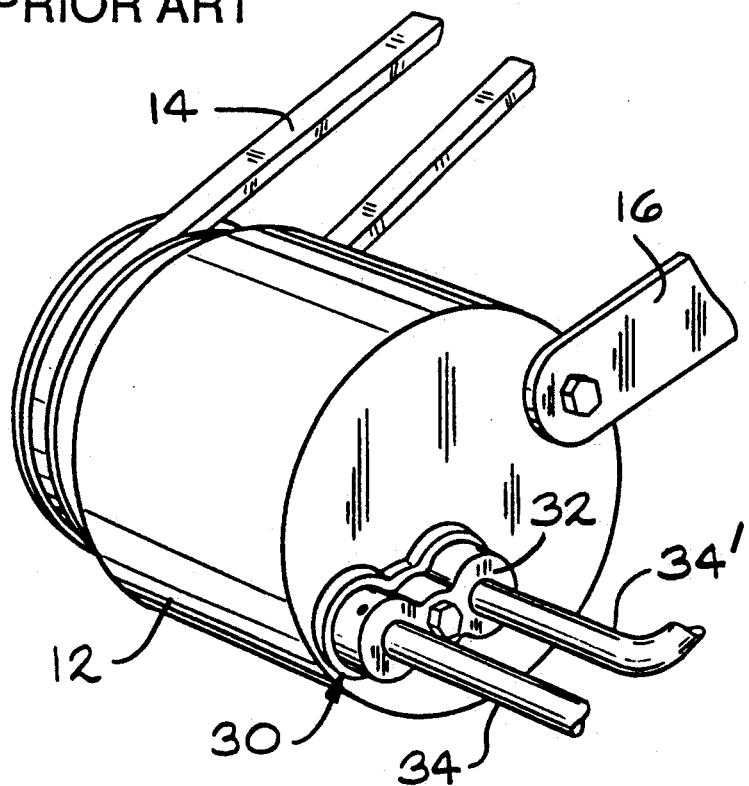
FIG. 2 is a perspective view of the present invention attached to an automotive air conditioning compressor.

The coupling assembly 30 of the present invention is shown in FIG. 2. In FIG. 2, the assembly 30 is shown as being attached to an automotive air conditioning compressor 12 by way of example. However, the present invention can be attached to any suitable fluid transport unit depending on the application. The compressor 12 is attached to a drive belt 14 and a bracket 16.

The present invention includes a flange 32 and at least one tube 34. As described below in detail, the tubes 34 and 34' are movable with respect to the flange 32. This allows the compressor to be moved sufficiently to adjust or change the drive belt 14. It also allows for relatively simple manufacture of the coupling assembly and relatively inexpensive packaging of the unit to which the assembly is attached.

Figure 3:
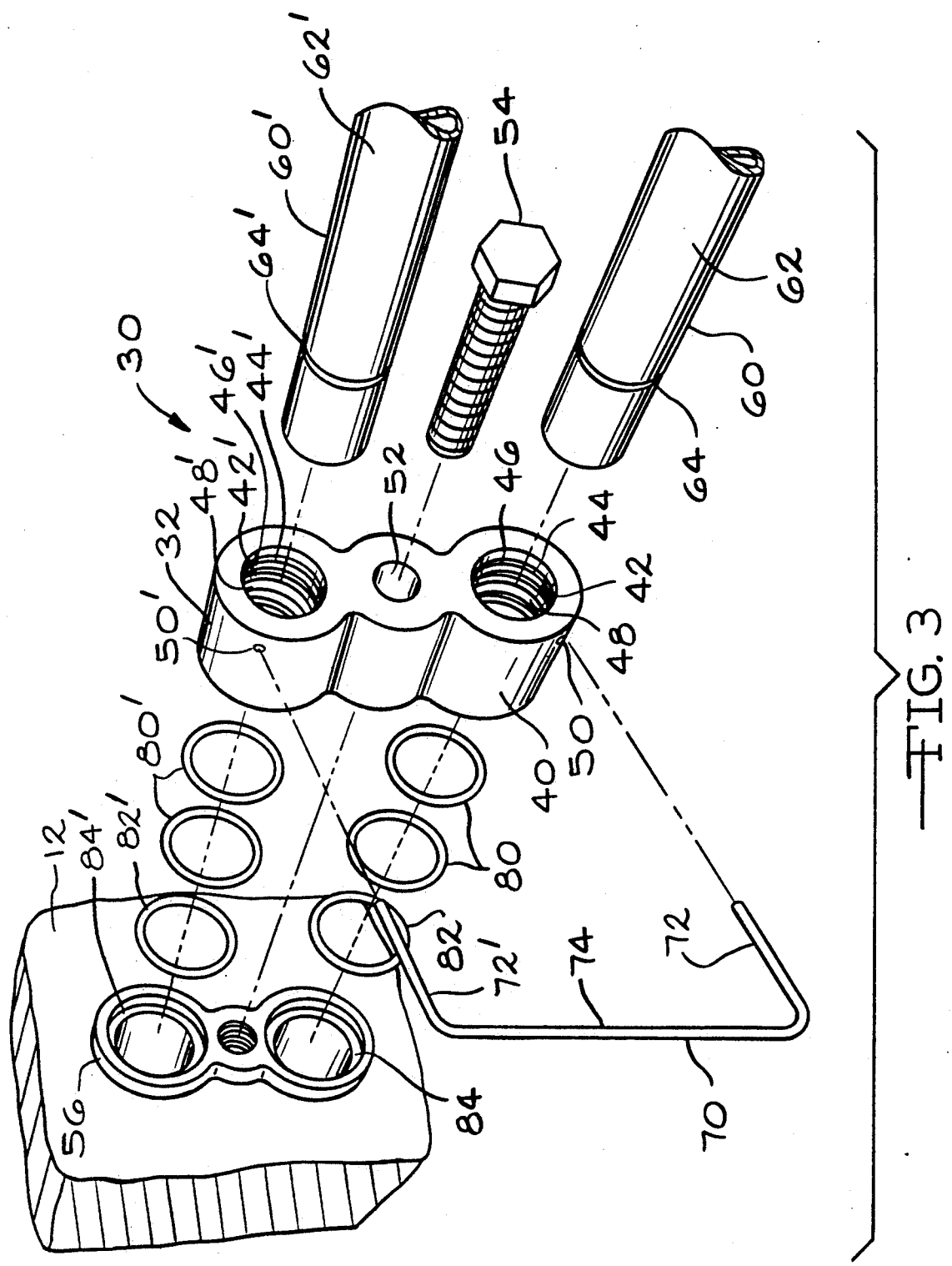
FIG. 3 is an exploded view of the present invention.

Referring to FIG. 3, the coupling assembly 30 includes a flange 32. The flange 32 has an outer surface 40 and at least one inner surface 42. In the present embodiment, the flange 32 has two inner surfaces 42 and 42'. The flange 32 further includes at least one tube receiving opening 44 defined by the inner surface 42. In the present embodiment, there are two tube receiving opening 44 and 44' defined by the inner surfaces 42 and 42', respectively. The flange 32 also includes flange groves 46 and 46' defined by inner surfaces 42 and 42', respectively. The flange 32 further includes two O-ring receiving grooves 48 and 48' defined by the inner surfaces 42 and 42', respectively, of the flange.

Still referring to FIG. 3, the flange 32 has at least one tube connection means hole 50 extending through the flange from the outer surface 40 to the inner surface 42. The hole 50 is in communication with the flange groove 46. In the present embodiment, there are two holes 50 and 50' in communication with flange grooves 46 and 46', respectively.

The flange 32 includes a bolt receiving opening 52. A bolt 54 is inserted through the opening 52 to attach the flange to the exterior surface of the compressor 12. In the present embodiment, a compressor attachment flange 56 is positioned between the flange 32 and the compressor 12. However, it should be understood that the flange 32 can be attached directly to the compressor 12 or the flange 32 can be an integral part of the compressor unit as more clearly shown in FIGS. 13 and 15.

The flange 32 can be made of any suitable material. It has been found that metal and plastic are preferred. If the flange is integral with a fluid transport unit, such as a compressor, the flange can be injection molded with a plastic material directly on the unit.

Referring to FIG. 3, the coupling assembly 30 includes at least one tube 60. In the present embodiment, two tubes 60 and 60' are shown. Each tube has an exterior surface 62 and 62', respectively. Each tube also has tube grooves 64 and 64' defined by the exterior surfaces 62 and 62', respectively. In this embodiment, the tube groove 64 is an annular groove extending around the exterior surface 62 of the tube 60.

The ends of the tubes 60 and 60' are inserted in the tube receiving openings 44 and 44', respectively, of the flange 32. When the tubes are inserted in the tube receiving openings, the tube grooves 64 and 64' are aligned with the flange grooves 46 and 46', respectively. When the grooves are so aligned, they form an annular chamber.

The tubes 60 and 60' can be made of a variety of materials. It has been found that metal and plastic are suitable materials, with metal being preferred.

Still referring to FIG. 3, the coupling assembly 30 includes a tube connection means 70. In the embodiment shown in FIG. 3, the connection means 70 is a U-shaped wire. The connection means 70 includes legs 72 and 72' and drive portion 74. The drive portion aids in the insertion of the legs 72 and 72' during assembly. The wire can be made of a variety of materials, with a flexible metal being preferred.

As shown in FIGS. 4-7, the tube connection means 70 can be inserted in the tube connection means holes 50 and 50' in a variety of ways depending on the application. In FIG. 4, leg 72 is inserted in tube connection means hole 50 that is located near the center of the flange 32. Leg 72' is inserted in hole 50' that is near the outside of the flange 32. When legs 72 and 72' are inserted in the holes 50 and 50', respectively, the legs mate with the flange grooves 46 and 46' and the tube grooves 64 and 64' by encircling the respective grooves or at least partially encircling such grooves. This mating arrangement acts to retain the tubes 60 and 60' in moving engagement with the flange 32. The tubes 60 and 60' are free to rotate within the flange 32. Once the legs 72 and 72' have been fully inserted, the drive portion 74 can be removed from the legs.

Referring to FIG. 5, the tube connection means holes 50 and 50' are both located near the outside of the flange 32. As shown in FIG. 6, the holes 50 and 50' are both located near the center of the flange 32.

Referring to FIG. 7, the tube connection means 70 can be wire pins having legs 72 and 72' and drive portions 74 and 74' in the form of heads. The pins are inserted in the tube connection means holes 50 and 50' by applying force to the drive portions 74 and 74'. Once inserted, the drive portions 74 and 74' are flush with the outer surface 40 of the flange 32. If desired, the drive portions 74 and 74' can be removed after insertion.

Figure 14:
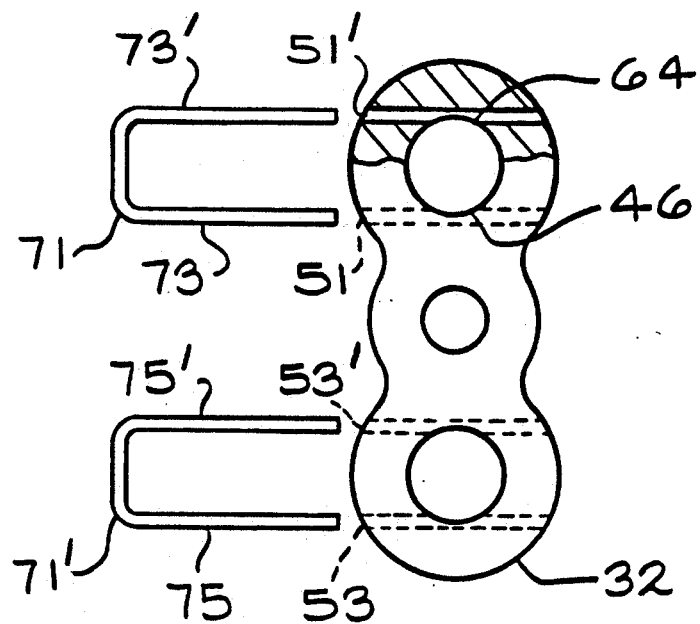
FIG. 14 is a side view of a fifth embodiment of the present invention showing the insertion of two U-shaped tube connection means in the tube connection means holes to engage the tubes; and, FIG. 15 is a cross sectional view of the present invention showing the flange as an integral part of an automotive air conditioning compressor wherein the tubes include O-ring receiving channels.

Referring to FIG. 14, the tube connection means can be two U-shaped wires 71 and 71' having legs 73 and 73', and 75 and 75', respectively. The legs 73 and 73' are inserted in holes 51 and 51', respectively, and the legs 75 and 75' are inserted in holes 53 and 53', respectively. The holes 51, 51', 53 and 53' extend completely through the flange 32. In this embodiment, the legs do not encircle the flange grooves 46 and 46' or the tube grooves 64 and 64'. Instead, the legs partially engage the grooves to retain the tubes in moving engagement with the flange 32.

Referring to FIGS. 3 and 8-12, the coupling assembly 30 can include at least one tube O-ring 80 positioned in an O-ring groove 48 on the flange 32. The tube O-ring provides a seal between the flange 32 and the exterior surface 62 of the tube 60. An additional flange O-ring 82 can be positioned in a space 84 defined by the compressor 12. The space 84 can also be defined by the compressor flange 56 as shown in FIG. 3. The O-rings can be made of any suitable elastomeric material.

Figures 8, 9:
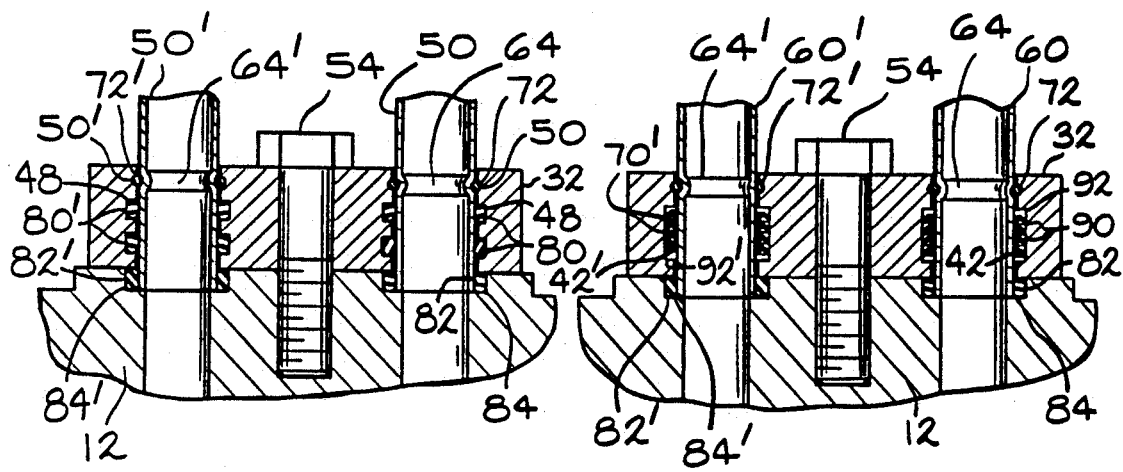
FIG. 8 is a cross-sectional view taken along line 8—8 of FIG. 4 showing the present invention attached to an automotive air conditioning compressor.
FIG. 9 is a cross-sectional view similar to FIG. 8 showing a plurality of chevron shaped seals.
Figures 12, 13:
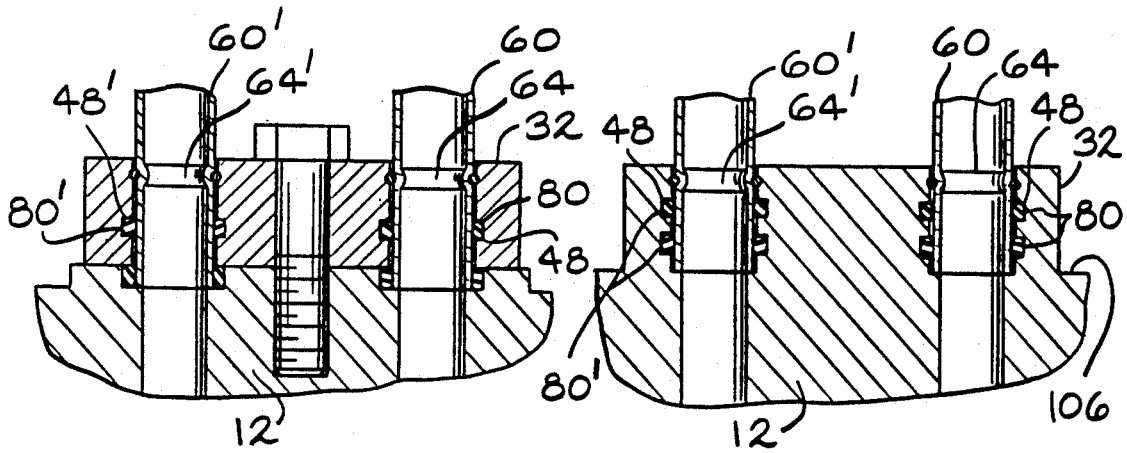
FIG. 12 is a cross-sectional view similar to FIG. 8 showing one O-ring between the flange and the tube.
FIG. 13 is a cross-sectional view of the present invention showing the flange as an integral part of an automotive air conditioning compressor.

Referring to FIG. 8, two pairs of tube O-rings 80 and 80' are positioned in two pairs of O-ring grooves 48 and 48', respectively. Two flange O-rings 82 and 82' are positioned in spaces 84 and 84', respectively, defined by the compressor unit 12. As shown in FIG. 12, single tube O-rings 80 and 80' can be positioned in the O-ring grooves 48 and 48', respectively.

Referring to FIG. 9, a plurality of chevron shaped seals 90 can be used in place of the above described tube O-rings 80. The seals 90 are positioned in a seal groove 92 defined by the inner surface 42 of the flange 32.

Figures 10, 11:
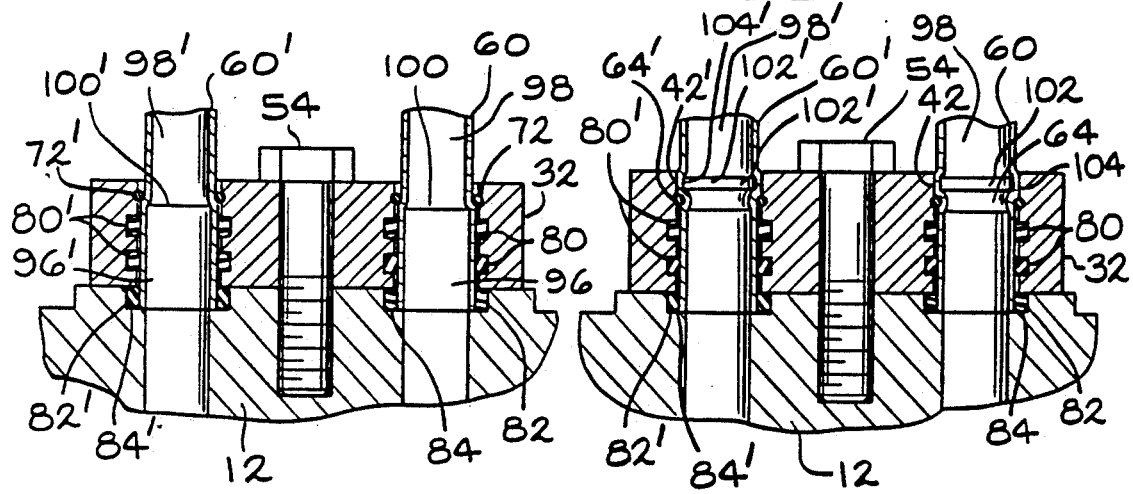
FIG. 10 is a cross-sectional view similar to FIG. 8 showing a tube groove formed by the junction of different diameters of a tube.
FIG. 11 is a cross-sectional view similar to FIG. 8 showing a groove having a raised portion along one edge of the tube groove.

Referring to FIG. 10, the tube groove 64, as described above, can be replaced by a groove formed by the junction of two sections of the tube 60. In this embodiment, a first section 96 of the tube has a diameter larger than the adjacent second section 98 of the tube. Thus, the tube groove, or the area around which the leg 72 mates, is the junction 100 of the first section 96 and second section 98.

Referring to FIG. 11, the second section 98 of the tube 60 can include an enlarged portion 102 adjacent to the tube groove 64. The enlarged portion 102 is positioned in an enlarged portion groove 104 defined by the inner surface 42 of the flange 32.

Referring to FIG. 13, the flange 32 can be integral with a fluid transport unit such as a compressor 12. In this embodiment, the flange 32 extends outwardly from the exterior surface 106 of the compressor unit 12. When the flange 32 is integral with the compressor unit 12, there is no need for flange O-rings. There are usually at least one pair of tube O-rings 80 positioned in O-ring grooves 48.

Figure 15:
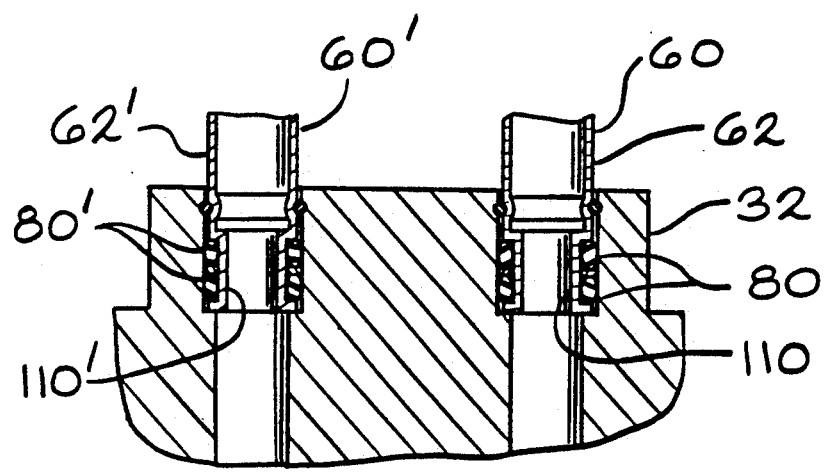

Referring to FIG. 15, the tube O-rings 80 and 80' can be positioned in O-ring receiving channels 110 and 110', respectively. The channels are defined by the exterior surfaces 62 and 62' of tubes 60 and 60', respectively. In this embodiment, the O-ring receiving channels replace the O-ring receiving groove 48 of the flange 32.

It should be understood that many changes can be made to the coupling assembly disclosed in the drawings and still fall within the scope of the following claims.

We claim:

1. A coupling assembly for use with an automotive air conditioning compressor comprising, in combination:

a flange, said flange having an outer surface and two inner surfaces, said inner surfaces defining two tube receiving openings, said inner surfaces each defining a flange groove, said flange having a connection means hole for each inner surface extending through said inner flange from said outer surface to said inner surface, each of said holes being in communication with a respective one of said flange grooves;

two tubes, said tubes each having an exterior surface, said exterior surfaces of said tubes each defining a tube groove on said exterior surfaces, said tubes inserted in said tube receiving openings, said tube grooves being aligned with said flange grooves; and a single flexible wire tube connection means having a drive portion and legs, said legs of said tube connection means inserted in said tube connection means holes, said legs encircling said flange grooves and said tube grooves, whereby said tubes are retained in said flange while said tubes are free to rotate within said flange.

2. The coupling assembly of claim 1, wherein said flange is integral with a fluid transport unit.

3. The coupling assembly of claim 1, wherein said flange is attached to the exterior surface of a fluid transport unit.

4. The coupling assembly of claim 3, wherein said flange includes an opening for the insertion of a bolt to attach said flange to said exterior surface of said fluid transport unit.

5. The coupling assembly of claim 1, wherein said inner surfaces of said flange each define two O-ring receiving grooves.

6. The coupling assembly of claim 5, wherein O-rings are positioned in said O-ring receiving grooves.

7. The coupling assembly of claim 1, wherein said tube grooves are annular grooves extending around said exterior surfaces of said tubes.

8. The coupling assembly of claim 1, wherein said tubes each has a first section having a diameter larger than an adjacent second section, said tube grooves being the junction of said first and second sections.

* * * * *